July 29, 1952 J. L. BRACK 2,604,680
CLIP FOR ATTACHING MOLDINGS
Filed Oct. 28, 1946
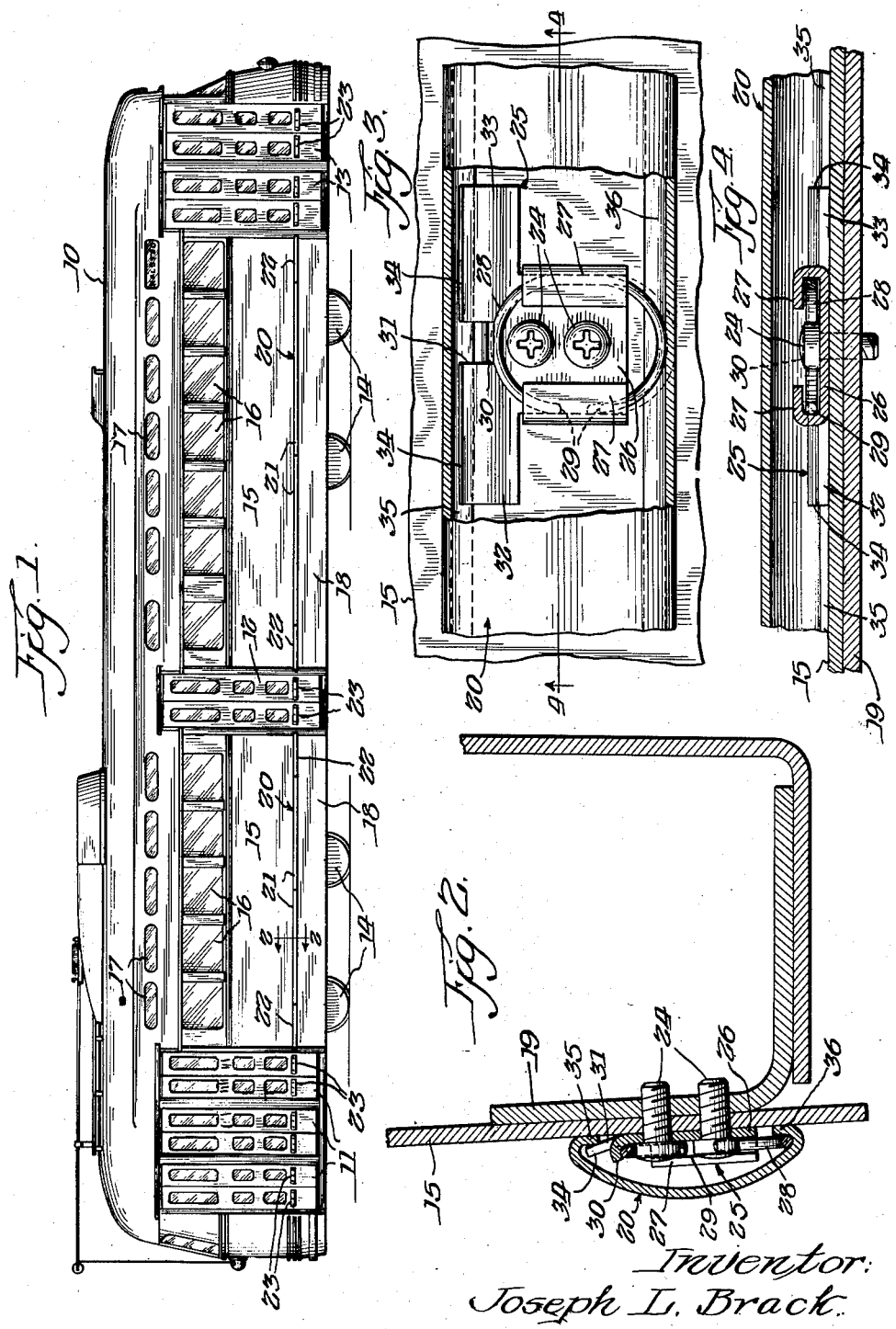
Inventor:
Joseph L. Brack
By Oscar Hochberg Atty.

Patented July 29, 1952

2,604,680

UNITED STATES PATENT OFFICE 2,604,680

CLIP FOR ATTACHING MOLDINGS

Joseph L. Brack, Chicago, Ill., assignor to Pullman-Standard Car Manufacturing Company, Chicago, Ill., a corporation of Delaware Application October 28, 1946, Serial No. 706,274

8 Claims. (Cl. 24—73)

1

This invention relates to a rub rail molding used on vehicles of the type such as street railway cars, trolley coaches or buses as somewhat of a fender to avoid marring the finish of the vehicle through contact with other vehicles on the street, and which serves also as an ornamental trim.

The primary object of the invention is the provision of fastening means for the rub rail adapted to provide for ready installation and removal of the molding for purposes of maintenance and repair.

Important objects of the invention are realized in an attaching bracket for the rub rail molding which is secured to the vehicle side wall, and having a spring functioning in combination with means on the bracket to draw the molding tightly into sealing engagement with the side wall.

The foregoing and other and important objects of the invention are attained by the arrangement illustrated in the accompanying drawings, in which Fig. 1 is a general side elevation view of a surface lines rail vehicle equipped with the rub rail molding of this invention, showing the location of the molding on the lower portion of the side wall with a depending skirt therebeneath and extending in sections throughout the panel areas of the side, and having members mounted on the doors in alignment therewith to provide simulated continuations of the molding in these areas;

Fig. 2 is a vertical cross sectional view to larger scale through the rub rail molding and one of its attaching brackets, taken on the line 2—2 of Fig. 1, indicating the manner in which the molding is drawn into sealing engagement with the car side at the top through the downward pressure exerted by the spring, and showing the direct securement of the attaching bracket to the side sill member through the side wall;

Fig. 3 is a front elevational view, also to larger scale, of the rub rail molding with portions broken away fully to reveal the attaching bracket, with the spring operatively disposed within the confining flanges on the bracket between a stop at the upper side and the molding at the bottom side, and one of the securing screws locking the spring in place, and showing the upper flange on the bracket supporting the molding; and Fig. 4 is a horizontal sectional view taken on the line 4—4 of Fig. 3 through the attaching bracket, showing the spring retained by the flanges and securing screw and with the molding engaged over the upper flange on the bracket.

The invention is disclosed as applied to a street railway vehicle but is also applicable to any other surface type vehicle, such as buses or trolley coaches. A general picture of a surface lines rail vehicle is provided in Fig. 1 and upon which the sectional molding of this invention is incorporated at each side in the lower portion of the respective side walls. In this view 10 represents the vehicle as a whole, having entrance doors 11 at the rear of the vehicle with an exit door 12 adjacent the center of the vehicle and exit doors 13 at the front end. The vehicle is supported upon spaced trucks 14. Each side wall structure 15 is provided in the upper areas with windows 16 and standee windows 17, and below the side wall depending skirts 18 conceal the underneath equipment and afford a clean-cut streamlined appearance.

The rub rail molding or object 20 is disposed substantially at the lower edge of the side wall 15 closely adjacent to the joint between the side wall and the skirt 18, directly at the position of the side sill 19 to which the molding is indirectly secured through the medium of the attaching brackets. The molding is disposed in sections arranged end to end and extending continuously throughout the full length of the side wall panel areas and is complemented by simulated extensions on the doors 11, 12 and 13. The molding is comprised of center sections 21 and relatively shorter end sections 22 in the side panel areas, while the individual door panels are each equipped with a short strip 23 rigidly secured to the doors in alignment with the rub rail molding to provide, in effect, continuations thereof across the doors. The sections 21 and 22 are disposed in end abutting relation and the adjoining ends of all of the sections are open, but the exposed ends of the sections 22 are closed to exclude weather. The rub rail molding is shown only as applied on the service side of the vehicle, but a molding is similarly applied on the other side of the vehicle extending throughout the full length thereof in sections similar to the sections 21 and 22 on the service side.

The molding sections 21 and 22 are all detachably mounted for ease of installation, maintenance and replacement purposes and are releasably secured to the side wall 15 by means of fixed attaching members disposed at intervals along the length of the moldings and rigidly secured through the side wall 15 to the side sill 19, each by means of a pair of securing elements or screws 24 threaded through the side wall panel and into the side sill. The attaching members each comprise a generally T-shaped bracket 25 in which the vertical leg portion 26 is formed with rebent flanges 27 at the respectively opposite edges, disposed in opposing relation, to provide guiding channel ways for receiving a yieldable means or loop type spring 28. The screws 24 securing the bracket to the side wall are entered through the vertical leg portion 26, and it will be seen that the screws are so disposed and the heads thereof are of such size as to prevent withdrawal of the spring from the guiding channel ways once the screws are set in position substantially in the center of the bracket with the spring encircled thereabout.

The spring 28 comprises a vertically elongated open loop having rounded top and bottom portions, with the open ends 29 confined within the guiding channel way 27 at one side and the straight opposite side confined within the other guiding channel way. The lower curved portion of the spring extends below the lower extremity of the vertical leg 26, while the upper curved portion is disposed above the topmost securing screw 24 and is adapted to bear against an overlying flange 30 struck out from the base plate portion of the attaching bracket to provide a stop against which the spring is adapted to react in operation. The force of the spring is directed downwardly and it is against this backstop that the spring functions in the operation of securing the rub rail molding to the vehicle.

The top crossbar of the T-shaped attaching bracket is formed by two laterally extending plate portions 32 and 33 at opposite sides of the cutout 31 for the spring seat 30, and each of these portions is formed with an upwardly sloping flange 34 upon which the rub rail molding sections are adapted to be supported. The spring 28 functions in cooperation with the supporting flanges 34 on the attaching bracket in the securement of the rub rail molding to the vehicle side wall, and in order to provide for cooperation of the rub rail molding with the supporting flanges 34 and spring 28, the rub rail molding sections are formed with upper and lower inwardly directed rebent flanges 35 and 36 respectively, which are engageable, respectively, with the flanges 34 at the top and the spring 28 at the bottom.

In the application of the rub rail molding to the vehicle, the individual molding sections 21 or 22 are installed by hooking the lower flange 36 under the bottom loop of the spring 28 in its free expanded condition, which is indicated in dotted lines in Fig. 3, with the upper flange 35 free of the bracket, and then lifting the molding section with sufficient pressure to compress the spring until the upper flange 35 may be passed over the flanges 34 on the attaching bracket, whereupon pressure on the molding may be released, and the downward force exerted by the spring reacting against the stop 30 will then cause the molding to be drawn downwardly over the supporting flanges 34, and, due to the slope of these flanges, the molding also will be drawn inwardly, tightly against the side wall 15 to provide a weathertight seal. The molding sections are installed on each bracket in this manner, and when it is desired to remove them from the brackets, it is necessary merely to lift the molding section against the resistance offered by the spring 28, sufficiently to enable the upper flange 35 to clear the supporting flanges 34 on the attaching bracket, whereupon the molding may be released from the bracket in a downward motion, disengaging the lower flange 36 from the spring.

From the foregoing, it will be seen that a very rigid fastening has been provided for a vehicle rub rail molding which enables the molding quickly and easily to be installed or removed, and which insures weathertight relationship between the molding and vehicle side, and which is of simple but rugged design and easy to manufacture and install.

What is claimed is—

1. Supporting means for a molding or the like having inwardly directed flanges in opposed relation, said means comprising a retaining bracket including a T-shaped base plate having a vertical leg and a cross-bar, a rebent flange at each side of the vertical leg providing a pair of vertically disposed channel shaped guide ways in opposing relation, a pair of upwardly and outwardly sloping supporting flanges at the top of said crossbar, an outwardly projecting spring seat located between said supporting flanges above the level of said guide ways, a spring disposed in said guide ways seated against said spring seat and extending below the bottom of said vertical leg, and securing means for said bracket surrounded by said spring and adapted to retain said spring in the guideways, said supporting flange and said spring engageable respectively with said inwardly directed flanges on the molding.

2. Supporting means for a molding or the like having inwardly directed flanges in opposed relation, said means comprising a retaining bracket including a T-shaped base plate having a vertical leg and a cross-bar, a rebent flange at each side of the vertical leg providing a pair of vertically disposed channel shaped guide ways in opposing relation, an upwardly and outwardly sloping supporting flange at the top of said cross-bar, an outwardly projecting spring seat located above the level of said guide ways, a spring disposed in the guide ways seated against said seat and extending below the guide ways, and securing means for said bracket surrounded by said spring and adapted to retain said spring in the guideways, said supporting flange and said spring engageable respectively with said inwardly directed flanges on the molding.

3. Supporting means for a molding or the like having inwardly directed flanges in opposed relation, said means comprising a retaining bracket including a base plate, a pair of rebent flanges disposed respectively at two sides of the base plate providing vertically disposed channel shaped guide ways in opposing relation, an upwardly and outwardly sloping supporting flange adjacent the top of said base plate, a spring seat on the base plate above the level of said guide ways, a spring disposed in the guide ways seated against said seat and extending below the guide ways, and securing means on said base plate surrounded by said spring and adapted to retain said spring in the guideways, said supporting flange and said spring engageable respectively with said inwardly directed flanges on the molding.

4. Supporting means for a molding or the like having inwardly directed flanges in opposed relation, said means comprising a retaining bracket including a base plate, a pair of rebent flanges on the base plate providing vertically disposed channel shaped guide ways in opposing relation, a supporting flange at the top of said base plate, a spring seat on the base plate below the level of said supporting flange, a spring disposed in said guide ways seated against said seat and extending below the guide ways, and securing means for said base plate surrounded by said spring and adapted to retain said spring in the guideways, said supporting flange and said spring engageable respectively with said inwardly directed flanges on the molding.

5. Supporting means for a molding or the like having opposed attaching flanges, said means comprising a retaining bracket including a base plate, means securing the base plate to a supporting surface, a pair of rebent flanges on the base plate providing vertically disposed guide ways in opposed relation, a supporting flange at the top of said base plate, a spring seat on the base plate below said supporting flange, a spring disposed in said guide ways seated against said seat and extending below the guideways, and means surrounded by said spring adapted to retain said spring in the guideways, said supporting flange and said spring engageable respectively with said attaching flanges on the molding.

6. Means for securing an object to a supporting surface comprising a plate having a flange and provided with a guideway, means adapted to secure said plate to said supporting surface, and yieldable means disposed in said guideway and surrounding the first-named means and in engagement with said plate, said first-named means being adapted to retain said yieldable means in said guideway and said yieldable means and said flange on said plate being adapted to engage said object and secure the same to said supporting surface.

7. Means for securing an object to a supporting surface comprising a plate having a flange and provided with a guideway, at least one securing element extending through said plate and adapted to extend into said supporting surface, and a spring disposed in said guideway and surrounding said securing element and in engagement with said plate, said securing element being adapted to retain said spring in said guideway and said spring and said flange on said plate being adapted to engage said object and secure the same to said supporting surface.

8. Means for securing an object to a supporting surface comprising a plate having a flange and provided with a guideway, at least one securing element extending through said plate and adapted to extend into said supporting surface, and a loop-shaped spring disposed in said guideway and surrounding said securing element and in engagement with said plate, said securing element being adapted to retain said spring in said guideway and said spring and said flange on said plate being adapted to engage said object and secure the same to said supporting surface.

JOSEPH L. BRACK.

REFERENCES CITED

The following references are of record in the file of this patent:

UNITED STATES PATENTS

| Number | Name | Date |
| --- | --- | --- |
| 1,064,897 | Gabet | June 17, 1913 |
| 1,305,233 | Ogden | May 27, 1919 |
| 2,033,448 | Rodack | Mar. 10, 1936 |
| 2,051,673 | Ball | Aug. 18, 1936 |
| 2,070,839 | Place | Feb. 16, 1937 |
| 2,147,779 | Van Uum | Feb. 21, 1939 |
| 2,163,455 | Van Uum | June 20, 1939 |
| 2,173,524 | Van Uum | Sept. 19, 1939 |
| 2,175,814 | Pender | Oct. 10, 1939 |
| 2,221,009 | Van Uum | Nov. 12, 1940 |
| 2,258,264 | Schultz | Oct. 7, 1941 |
| 2,264,228 | Wagner | Nov. 25, 1941 |
| 2,267,512 | Van Uum | Dec. 23, 1941 |
| 2,287,606 | Eady | June 23, 1942 |
| 2,330,675 | Brown | Sept. 28, 1943 |